United States Patent Office 3,235,366
Patented Feb. 15, 1966

3,235,366
NON-AQUEOUS PESTICIDAL DISPERSION CONTAINING A CROSS-LINKED POLYMER
Keith G. Seymour and Barry C. Byrd, Lake Jackson, Tex., assignors to The Dow Chemical Company, Midland, Mich., a corporation of Delaware
No Drawing. Filed Aug. 27, 1962, Ser. No. 219,715
9 Claims. (Cl. 71—2.6)

This invention relates to pesticidal formulations and more particularly is concerned with various novel compositions whereby reduced drift loss of non-aqueous soluble and non-aqueous dispersible herbicides, insecticides, growth regulating chemicals and the like biologically active pesticidal agents is accomplished in applications of such chemicals. These pesticidal agents generally are said to be "oil-soluble." The term "oil" as used herein is meant to include those liquid non-aqueous, non-ionic solvents or dispersants that are employed as carriers for the pesticides described hereinbefore. These carriers include, for example, (1) the widely used liquid paraffin hydrocarbons such as kerosene and diesel fuel oil (2) liquid aromatic hydrocarbons such as toluene and xylene, (3) alkanols (4) esters (5) substituted hydrocarbons and the like.

Generally, biologically active chemicals are applied in agricultural applications through the use of portable spray mechanisms, e.g. ground and aerial spray applicators. However, because of potential damage to adjacent areas through wind drift of the sprayed particles, economical spray techniques can be carried out in many areas only when certain specified atmospheric conditions prevail. For example, in spraying certain herbicides there is the problem of killing desired as well as unwanted vegetation. The smaller particles of the sprayed herbicide composition will drift a considerable distance depending on the particle size, temperature, and the velocity of the wind. The active compounds in these weed killers are extremely potent, even in very small quantities. The damage to a crop, neighboring the sprayed area, may vary from reduced yield to an outright kill, depending upon the amount of compound reaching the plant, the plants' sensitivity, the stage of development of the plants and other variables. The problem is further aggravated by the addition of agents to the formulation of the spray to increase the coverage.

A similar problem has been encountered in the application of insecticides to certain non-edible crops in fields adjacent to other crops used as fodder for livestock. For example, in the accidental spraying of a dichlorodiphenyltrichloroethane composition on alfalfa which later was fed to cattle, residues of the insecticide on this crop made it unfit for dairy cattle as these residues were found in the milk; see J. Ag. Food Chem. Vol. 7, No. 10, October, 1959, p. 679.

In certain areas, predominantly the West, where checkerboard agriculture is the pattern, this spray drift problem is acute. The seriousness of the problem is emphasized by the existence of laws in many states controlling the use and application of certain agricultural and horticultural sprays.

It is a principal object of the present invention to provide a sprayable, drift-controlling, particulate composition of a biologically active pesticidal agent in a non-aqueous solvent in combination with an oil-swellable polymer.

Another object of the present invention is to provide a method for markedly reducing the drift of sprayed, non-aqueous, pesticidal formulations.

An additional object of the present invention is to provide a composition containing a herbicidal, insecticidal or fungicidal commodity which can be successfully administered by aerial application and which does not suffer appreciable spray drift during administration.

A still further object of the present invention is to provide a particulate, sprayable pesticidal composition containing substantially no free liquid carrier vehicle.

Other objects and adavntages will become apparent from the detailed description presented hereinafter.

The foregoing and additional objects are accomplished by providing a non-aqueous dispersion containing an effective quantity of an oil-soluble herbicide, insecticide, growth regulator or other biologically active agent and containing from about 0.2 to about 20 percent by weight or more of a substantially oil-insoluble, oil-swellable, crosslinked polymer.

The term "oil-insoluble polymer" and "oil-swellable polymer" as used herein refers to those polymers having the property of being substantially insoluble in, but capable of being swollen by one or more non-aqueous, non-ionic organic liquids such as, for example, benzene, toluene, xylene, n-dodecane, isopropanol, isobutanol, n-hexane, n-butanol, ethyl acetate, isobutyl acetate, cyclohexane, trichloroethane, tetrachloroethylene, kerosene, diesel fuel oil and the like. These and other similar liquid organics can be used as vehicles, i.e., solvents or carriers, for the pesticides. However, because of economic and toxicological reasons generally diesel fuel oil, kerosene, toluene, xylene, deodorized kerosene, naphthas, liquid aromatic hydrocarbons, mineral spirits and the like, for example, as known to one skilled in the art, are used as pesticidal carriers.

Preferably, crosslinked polymers of the esters of polyacrylic acid are utilized as the gelling agent, i.e., swellable polymer, for the pesticidal solutions and dispersions. However, any crosslinked polymer whose linear analogue is oil-soluble can be used; e.g., crosslinked polymers and copolymers of styrene, substituted styrenes, methacrylate esters, acrylic acid esters, vinylbenzenes, and vinyl esters of aliphatic carboxylic acid esters such as lauryl acrylate crosslinked with a polyethylene glycol diacrylate; polystyrene, polymethylstyrene, poly-t-butylstyrene, poly-(2-ethylhexyl acrylate) and copolymers of these with divinylbenzene or other conventional crosslinking materials can be employed as swelling agents.

In preparing the crosslinked oil swellable polymers suitable for use in the present invention small amounts of a cross-linking agent, e.g., diethyleneglycol dimethacrylate or divinylbenzene, as ordinarily employed in such polymerization processes, can be employed. Generally, for compositions containing a crosslinking agent, the amount of the agent employed in preparing the swellable polymer ranges from about 0.01 to about 3 percent or more based on the polymer weight. Preferably from about 0.05 to about 1 percent of the crosslinking agent, as based on the polymer weight, is employed.

The various crosslinked polymers suitable for use in the practice of the present invention will imbibe different quantities of the oil solvent or dispersant containing the pesticide in the formulation depending both on the amount of crosslinking of the polymer and the characteristics of the oil vehicle employed. Generally as the amount of polymeric crosslinking increases above a certain minimal valve the amount of solvent imbibed decreases.

It is not meant to be construed, however, that the least amount of crosslinking necessarily is preferred, for, both the swelling characteristics of the polymer and the resistance of the gelled polymer particle against mechanical degradation during the spraying process must be considered. The amount of crosslinking must be sufficient to assure maintenance of a predetermined minimum polymer particle size throughout the spraying process.

The actual amount of crosslinking to be employed, therefore, for a given polymer is determined from the characteristics of the polymer, the oil vehicle employed and the manner of application as is understood by one skilled in the art.

While oil-based pesticidal dispersions and solutions containing as low as 0.2 percent of the oil insoluble, oil-swellable crosslinked polymer based on the weight of the dispersion or solution will show some improvement in spray drift loss of the sprayable dispersions, it is desirable to use quantities of at least about 0.5 to about 20 percent based on the weight of the dispersion. Preferably from about 2 to about 15 percent of the polymer is employed. The amount to be employed will depend upon the kind and amount of pesticide to be used. In any event, an amount of crosslinked, oil-swellable oil-insoluble polymer should be used such that a dispersion results which contains no substantial amount of free liquid; i.e., substantially no interstitial liquid. The dispersion made up of discrete, elastic particles each of which remain as separate entities and do not coalesce on contact, are conveniently characterized by the term "granular liquid." Thus, the dispersions of this invention are particulate in nature and contain substantially no free liquid.

The polymers suitable for use in the present invention can be prepared by conventional means known to one skilled in the art. It is essential only that the crosslinked polymer product posses the properties and characteristics as set forth hereinbefore.

In the procedure of the present invention, a solution of an oil-soluble formulation of herbicide, insecticide, growth regulator or other biologically active agent is mixed with a predetermined weight of the crosslinked polymer, e.g., poly(2-ethylhexyl acrylate), so that a swelled gel results. Generally, this mixing is accomplished by merely adding the resin to the oil dispersion with agitation, provided that the agitation is not of sufficient magnitude to cause significant shearing of the polymer to particle size lower than about 0.05 mm. diameter. With gelled particle sizes smaller than those having about 0.05 mm. diameter, significant drift can result. Advantageously, the gelled solutions can be prepared by first pulverizing the crosslinked polymer to a desired particle size, such as will produce a swelled particle within the range of about .05 mm. to about 1.0 mm. in diameter, and then mixing the so-prepared powder into the oil solution with stirring.

Alternatively, chunks of the polymer can be added to an oil solution of the pesticide. This produces a gel-like mass as the polymer swells. This mass then can be broken up by vigorous agitation to give a gel structure of discrete gelled particles of a predetermined size range the same as are obtained by adding the pulverized polymer to the solution.

Another variable which provides still a third alternative of gel preparation is the spray equipment itself. The size of the spray nozzle and the atomizing pressure on it can be varied so that the sprayed particles are sheared to the proper range of sizes while passing through the nozzle or other orifice systems, e.g. a screen. Here the sprayer itself may act also as the stirring device. It is understood that the amount of swelling of the particles is dependent upon the particular polymer employed and the extent to which the polymer is crosslinked. Further, the amount of polymer used must be such that the pesticidal dispersion is substantially completely imbibed. Otherwise drift will result from any remaining interstitial liquid.

The discrete, swelled polymer particles which make up the gel structure of this invention hold the dispersion of chemical. Since the biologically active agent is integrally bound by the gel structure, it is carried with the gel particles through the spray system and onto the sprayed surface. Advantageously, the sprayed particles are kept within a certain size range of from about 0.05 mm. to about 1.0 mm. and preferably between about 0.08 mm. and 1.0 mm. although sprayed particles of somewhat larger diameter may be utilized in certain applications.

Quantities of oil soluble pesticide to be employed are those quantities which are effective. By this is meant those qauntities which would normally be employed in such biologically active compositions of the prior art, since the compositional matter of the present invention usually does not affect the biological activity of the active compound. Understandably, it is essential that the compatibility of the pesticide formulation and the polymer used be considered in the utilization of the invention.

Of course, an admixture of appropriate proportions of a suitable unswelled polymer with a suitable pesticide has utility, since this substantially dry mix can be added to an oil to achieve the results of the present invention.

An unclassified particulate crosslinked polymer resin having no particle smaller than that which will form a swollen particle having a diameter of at least about 0.05 mm. can be mixed with the pesticide and this mixture then added to oil. Alternatively and advantageously the resin first can be screened to a desired particle size; the so-classified polymer can be mixed with the pesticide; and, this mixture can be placed in oil, preferably with stirring, to formulate the pesticide in a gelled dispersion of preselected swelled particle size.

In these dry mixtures, it is to be understood that the amount of the oil-swellable, oil-insoluble, cross-linked polymer in the dry mixture is such that the gelled dispersion as produced in oil contains from about 0.1 to about 20 weight percent of the dispersion weight of the resin.

The amount of the pesticide used in the present composition is determined by the activity of the particular herbicide, or insecticide, for example, being used and the desired coverage. This in turn is somewhat dependent on the type of spray equipment being used and the consistency of the granular liquid being sprayed. These manipulative and operating procedures are known to one skilled in the art of using pesticides for control of weeds, grasses, insects, etc.

Additionally, if desired, surface active agents, wetting agents and dispersion promoters can be incorporated into the blend to promote wetting and correspondingly to more readily disperse the biologically active agents throughout the gelled product resulting from mixing the dry blend and oil.

Although the composition ordinarily is employed as discussed hereinbefore, it is to be understood that in certain instances, the particulate, non-aqueous dispersions can be carried in a thickened water or the like media. This approach is particularly useful for those applications wherein only a relatively small amount of pesticide is required to cover a given area. In such treatments rather than revise an entire spray appartus to assure proper coverage, the non-aqueous dispersion can be suspended within gelled or otherwise thickened water, for example. This then provides a sufficient volume of material whereby the standard spray equipment can be used. The thickened water has no effect either on the sprayed dispersion or the material being treated and merely serves as a convenient carrier.

The following examples will serve further to illustrate the present invention but are not meant to limit it thereto.

EXAMPLE 1

About 1.8 pounds of poly(2-ethylhexyl-acrylate) crosslinked with about 0.5 percent diethyleneglycol dimethylacrylate was added to a solution of about 2.2 gallons of kerosene containing about 15 volume percent of the butyl ester of 2,4,5-trichlorophenoxyacetic acid. The crosslinked polymer gelling agent was in unswelled bead form. The mix was allowed to stand overnight, about 18 horus, during which time the beads had swollen and had imbibed substantially the entire solution.

Some of the resulting, herbicide containing beads were placed on the leaves of young cucumber plants. After about 24 hours contact time, the leaves of the plants were found to be twisted and deformed in a manner typical of that obtained from contact with an ungelled solution of the herbicide.

In a second test, using the same mix concentrations but employing diesel fuel oil as a composition vehicle, the same results were obtained.

These tests serve to illustrate the fact that the biological activity of the herbicide is not detrimentally affected by the polymer additive or the gelling agent.

EXAMPLE 2

A polymer of t-butyl styrene crosslinked with about 0.1 percent by weight divinyl benzene was used to granulate a herbicidal solution composed of a mixture of 2,4-dichlorophenoxyacetic acid and 2,4,5-trichlorophenoxyacetic acid as their corresponding propylene glycol butyl ether esters in diesel fuel oil. Each herbicidal component was present at a concentration of 20 pounds acid equivalent per 100 galons of solution. The resulting granular dispersion contained about 7.1 w./vol. percent of the crosslinked polymer. In making this dispersion, dry unswollen polymer beads of diameter within the range of from about 0.125 to about 0.21 millimeter were mixed with the oil solution of herbicide. The resulting granular liquid, containing substantially no interstitial liquid, was composed of discrete particles each having a diameter of from about 0.52 to about 0.87 millimeter.

A rectangular chute about 2 feet wide by 2 feet high by about 8 feet long, fitted with a fan at one end and having the other end open, was used for spray drift testing. This chute had an inlet channel in its top near the open end, which channel extended upwardly from the top at right angles to this member. This channel contained two baffles in its side walls. These were located near the junction of the channel and the top of the chute and were positioned to form an angle of about 45° with the wall. The open end of the angle faced away from the junction of the two members. These baffles served to limit the breadth of a given sprayed mixture being injected into the test chute.

In testing for spray drift, potted cucumber plants were positioned along the bottom of the chute at intervals of 0.75, 2.25, 4.25 and 5.75 feet away from a base line across the bottom of the chute below the baffle-containing channel and away from the open end of the chute. One plant was placed outside of the chute behind the fan about 6.5 feet away from the base line. This plant served to determine the amount of finely divided air borne dispersion. The base line was at a right angle to the sidewalls of the chute and passed through a point directly below the vertically downward positioned spray nozzle located in the channel member.

In operation in an indoors test facility, air at a velocity of about 100 feet per minute was pulled by the fan through the open end of the chute and across the potted plants. The granular liquid, containing substantially no interstitial liquid, was sprayed through a Spraying Systems Co. flat atomizing 1/4 TT 6503 spray nozzle at a pressure of about 40 pounds per square inch gauge. The nozzle top was at a height of about three feet above the top of the chute. The spray entered the test chute at a right angle to the air stream.

As a control, this test was repeated except that no polymer additive was incorporated into the herbicide formulation. These plants were observed at various predetermined times after the treatment and a numerical designation assigned according to the following system:

0—no symptoms visible
1—visible petiole curl, visible tip curl, leaf or stem curvature
2—moderate stage of No. 1 symptoms, necrosis usually not present
3—severe stage of No. 1 symptoms, necrosis may be present
4—severe stage of No. 1 symptoms, severe to moderate necrosis, extensive plant damage
5—plant dead.

The results of the test and control runs are presented in Table I which follows:

*Table 1*

| Plant No. | Plant Distance (ft.) from Base Line | Results | | | | | |
|---|---|---|---|---|---|---|---|
| | | Granular Liquid | | | Control | | |
| | | One Day | Nine Days | Three Mo. | One Day | Nine Days | Three Mo. |
| 1 | 3/4 | 2 | 4 | 5 | 5 | 5 | 5 |
| 2 | 2 1/4 | 1 | 2 | 1 | 4 | 5 | 5 |
| 3 | 4 1/4 | 0 | 1 | 0 | 3 | 4 | 5 |
| 4 | 5 3/4 | 0 | 0 | 0 | 2 | 3 | 5 |
| 5 | 6 1/2 | 0 | 0 | 0 | 3 | 3 | 5 |

EXAMPLE 3

Two rows of three tomato plants per row, each plant being in a separate four-inch pot, were placed six feet apart in an outdoor test location. Ten-feet spacings were maintained between the pots in a given row.

2,4,5-trichlorophenoxyacetic acid as the propylene glycol butyl ether ester was used in a kerosene solution containing about one pound acid equivalent per gallon of herbicide. The solution was thickened with a crosslinked poly(2-ethylhexyl acrylate) which had been crosslinked with about 0.4 percent of diethyleneglycol diacrylate based on the polymer weight. To thicken the kerosene solution of the herbicide about 0.62 pound of polymer pre gallow of solution was employed. An air pad sprayer having a 50-mesh (U.S. Standard Sieve) screen, (sieve opening about 0.3 millimeter) in the nozzle (Spraying Systems Co. 1/4 TT 8004 nozzle) was used to spray the gelled solution at about 70 pounds per square inch gauge.

The spraying was carried out in a 5 second bursts with the spray nozzle being located about three feet above the ground and about three feet upwind from the first plant in each row and approximately midway between the two rows. The nozzle tip was pointed directly towards the ground in much the same position actually used in spraying a field with a tractor drawn spray rig.

During the spraying, the wind velocity was about 7.5 miles per hour and steady. The wind direction was essentially parallel to the rows of plants and towards the plants.

As a control, an ungelled solution of the herbicide was sprayed by the same technique onto a second set of tomato plants in a similar arrangement. For this test, the spray pressure was about 40 pounds per square inch gauge and the wind velocity was about 7 to 8 miles per hours with gusts up to 9 miles per hour.

To determine the effects of spray drift, the following system was employed.

Plants in each row were designated 1a, 2a, 1b, 2b, and 1c, 2c, the "a" plants being at the end of the rows nearest to the location of the spray nozzle. The plants were checked for symptoms of damage due to the drift of the pesticide at the end of one, two, and four days. Numerical ratings, assigned on the same basis as for Example 2, are given in Table II.

*Table II*

| Time After Spraying | Herbicide | Plant Condition | | | | | |
|---|---|---|---|---|---|---|---|
| | | Row 1 | | | Row 2 | | |
| | | a | b | c | a | b | c |
| One day | (Control) Soln | 0-1 | 3 | 3 | 3+ | 3 | 3 |
| | Gel | 0-1 | 0 | 0 | 0 | 0 | 0 |
| Two days | (Control) Soln | 0-1 | 3 | 3 | 3 | 3 | 3 |
| | Gel | 0-2 | 0 | 0 | 0 | 0 | 0 |
| Four days | (Control) Soln | 1 | 4 | 4 | 4 | 4 | 4 |
| | Gel | 2-3 | 0 | 0 | 0 | 0 | 0 |

EXAMPLE 4

A number of tests were run to determine the effectiveness of various cross-linked polymers as gelling agents in non-aqueous, non-ionic organic solvents as well as to show the effect of the concentration of the cross-linking agent, and, inherently therefore the amount of crosslinking of the polymer, on the ability of the polymer to swell in the presence of such "oil."

(a) Polybutylacrylate was crosslinked with 2.0 percent of diethyleneglycol dimethacrylate and the cross-linked polymer placed in various solvents to determine the amount of solvent taken up in swelling, i.e. the amount imbibed. The following Table III shows the results obtained in this test:

*Table III*

| Solvent | Volume Imbibed (gal./lb. of Polymer) |
|---|---|
| Benzene | 1.52 |
| Xylene | 1.22 |
| N-Dodecane | .28 |
| Isobutyl alcohol | .89 |
| Cyclohexane | .78 |
| Trichloroethylene | 1.33 |

(b) Poly(2-ethylhexyl acrylate) was crosslinked with various amounts of the same crosslinking agent used in Example 4(a). The crosslinked polymers then were placed in different solvents to determine the amounts imbibed. Table IV presents the results obtained from this study:

*Table IV*

| Solvent | Volume Imbibed (gal./lb. of polymer) (Percent Crosslinking Agent) | | |
|---|---|---|---|
| | 0.125 | 0.5 | 2.0 |
| Benzene | 3.17 | 1.63 | 1.24 |
| Xylene | 3.44 | 1.72 | 1.24 |
| N-Dodecane | 1.58 | 1.04 | .76 |
| Isobutyl alcohol | 1.03 | | .59 |
| Cyclohexane | | 1.49 | 1.15 |
| Hexane | | 1.26 | |
| Trichloroethylene | 2.48 | | 1.10 |

(c) In this example the same crosslinking agent was used as in the two preceding examples, 4(a) and 4(b), in an amount of 0.5 percent by weight, to crosslink three different polymers. Each of the resulting cross-linked products was tested to determine the amount of various solvents imbibed, as shown in the following Table V:

*Table V*

CROSSLINKED POLYMER

| Solvent | Polyocta-decyl acrylate | Polylauryl acrylate | Polylauryl methacrylate |
|---|---|---|---|
| | Volume Imbibed (Gal./lb. of Polymer) | | |
| Benzene | 1.90 | | |
| Xylene | 2.14 | 1.33 | 1.09 |
| n-Dodecane | 1.40 | 1.02 | |
| Cyclohexane | 2.02 | 1.23 | 1.09 |
| Hexane | 1.60 | 1.07 | 0.96 |
| Iso-octane | | 1.03 | 0.95 |
| Trichloroethylene | 2.03 | | |

In a manner similar to that described for the foregoing examples, an oil soluble insecticide (e.g. dichlorodiphenyl trichloroethane), carried in deodorized kerosene can be formulated into a granular liquid with a particulate or swellable crosslinked polymer described hereinbefore.

Various modifications can be made in the present invention without departing from the spirit or scope thereof for it is understood that we limit ourselves only as defined in the appended claims.

We claim:

1. A sprayable, particulate non-aqueous biologically active pesticidal dispersion the particles of which have diameters ranging from about 0.05 to about 1.0 millimeter in diameter and which contains substantially no free liquid which comprises:
    (a) a pesticidally effective quantity of a member selected from the group consisting of oil-soluble biologically active pesticidal agents,
    (b) oil, said oil being characterized as a liquid non-aqueous, non-ionic organic carrier for said biologically active pesticidal agents, and
    (c) a particulate crosslinked oil swellable, oil insoluble polymer, said polymer being substantially insoluble in, but capable of being swelled by said oil, the amount of said polymer in said dispersion ranging from about 0.2 to about 20 percent of the weight of said dispersion and being at least sufficient to imbibe substantially all of the oil in said dispersion.

2. A sprayable, particulate, non-aqueous biologically active pesticidal dispersion the particles of which have diameters ranging from about 0.08 to about 1.0 millimeter in diameter and which contains substantially no free liquid which comprises:
    (a) an effective quantity of a member selected from the group consisting of oil-soluble biologically active pesticidal agents,
    (b) an oil selected from the group consisting of diesel fuel oil, kerosene, toluene, xylene, deodorized kerosene, naphthas, liquid aromatic hydrocarbons and mineral spirits, and
    (c) a particulate, crosslinked, oil-swellable substantially oil-insoluble polymer selected from the group consisting of the crosslinked polymer and copolymers of
        (1) styrene
        (2) alkyl substituted styrenes
        (3) methacrylate esters
        (4) acrylic acid esters
        (5) vinylbenzenes, and
        (6) vinyl esters of aliphatic carboxylic acids
    the amount of said polymer in said dispersion ranging from about 0.5 to about 20 percent of the weight of said dispersion and being at least sufficient to imbibe substantially all of the oil in said dispersion.

3. The pesticidal dispersion as defined in claim 2 wherein the particulate oil-swellable, oil-insoluble polymer is a crosslinked polymer of an ester of poly acrylic acid.

4. A sprayable, particulate, non-aqueous herbicidal dispersion, the particles of which have diameters of from about 0.5 to about 0.9 millimeter in diameter and which contains substantially no free liquid which comprises:
  (a) a solution of a herbicidal mixture of 2,4-dichlorophenoxyacetic acid and 2,4,5-trichlorophenoxyacetic acid as the corresponding propylene glycol butyl ether esters in diesel fuel oil, said solution containing about 20 percent of said herbicidal mixture and said herbicidal mixture being composed of about 20 w./vol. percent of the dichloro substituted component and about 20 w./vol. percent of the trichloro substituted component based on their respective acid equivalents, and,
  (b) about 7 w./vol. percent of particulate particles of a polymeric tert- butyl styrene crosslinked with about 0.1 weight percent divinylbenzene.

5. A sprayable, particulate non-aqueous herbicidal dispersion, the particles of which are about 0.3 millimeter in diameter and which contains substantially no free liquid which comprises:
  (a) a kerosene solution of the heribicide 2,4,5-trichlorophenoxyacetic acid as the propylene glycol butyl ether ester, said solution containing about one pound acid equivalent per gallon of herbicide, and
  (b) a crosslinked poly(2-ethylhexyl) acrylate crosslinks to about 0.4 percent with diethyleneglycol diacrylate based on the polymer weight, said polymer being present in an amount equivalent to about 0.6 pound of polymer per gallon of said kerosene solution of said herbicide.

6. A composition containing a biologically active pesticidal agent and a substantially oil-insoluble, oil-swellable crosslinked polymer, said composition when mixed with an oil which is a liquid, non-aqueous, non-ionic organic carrier for said pesticidal agent providing a sprayable, biologically active pesticidal disperson, the amount of said polymer in said dispersion being from about 0.5 to about 20 percent of the weight of said dispersion.

7. A mixture of a biologically active pesticidal agent and a particulate, substantially oil-insoluble, oil-swellable crosslinked polymer, said mixture containing an amount of said polymer equivalent to from about 0.5 to about 20 weight percent of the sprayable particulate dispersion prepared as said mixture is added to an oil which is a liquid, non-aqueous, non-ionic organic carrier for said pesticidal agent and said pesticidal agent in said mixture being an amount to provide effective pesticidal action by said dispersion.

8. A method for reducing spray drift in applying a biologically active pesticide which comprises; spraying a pesticidally effective amount of a pesticidal gel, said gel produced by mixing an effective pesticidal amount of a member selected from the group consisting of oil soluble biologically active pesticidal agents with an oil in the presence of a particulate cross-linked oil-swellable, oil-insoluble polymer being substantially non-soluble in said oil and capable of being swelled by said oil, said oil being a liquid, non-aqueous, non-ionic organic carrier for said pesticidal agent, the amount of said polymer in said dispersion ranging from about 0.2 to about 20 percent of the weight of said dispersion and being at least sufficient to imbibe substantially all of the oil in said dispersion thereby to provide a particulate gelled dispersion of discrete elastic, non-coalescent particles of said polymer with said biologically active pesticidal agent and said oil, said particulate gelled dispersion having substantially no free liquid and the discrete particles of said gelled dispersion having an effective diameter of from about 0.05 to about 1.0 millimeter.

9. The process as defined in claim 8 wherein the pesticidal agent is a herbicide.

References Cited by the Examiner

UNITED STATES PATENTS

| 2,442,588 | 6/1948 | D'Alelio | 260—78.5 |
| 2,652,322 | 9/1953 | Hedrick et al. | 71—2.6 X |
| 2,726,150 | 12/1955 | Wolter. | |
| 2,810,716 | 10/1957 | Markus | 260—78.5 |
| 3,060,084 | 10/1962 | Littler. | |
| 3,097,087 | 7/1963 | Werner et al. | 71—2.4 |
| 3,131,119 | 4/1964 | Fordyce et al. | |

FOREIGN PATENTS 815,510    6/1959    Great Britian.

LEWIS GOTTS, *Primary Examiner.*

JULIAN S. LEVITT, *Examiner.*